(12) United States Patent
Ballet et al.

(10) Patent No.: US 8,172,397 B2
(45) Date of Patent: *May 8, 2012

(54) TRANSPARENT PIXELIZED OPTICAL COMPONENT WITH ABSORBING WALLS, ITS METHOD OF MANUFACTURE AND ITS USE IN THE MANUFACTURE OF A TRANSPARENT OPTICAL ELEMENT

(75) Inventors: Jerome Ballet, Charenton le Pont (FR); Christian Bovet, Charenton le Pont (FR); Jean-Paul Cano, Charenton le Pont (FR)

(73) Assignee: Essilor International (Compagnie Generale d'optique), Charenton le Pont (FR)

( * ) Notice: Subject to any disclaimer, the term of this patent is extended or adjusted under 35 U.S.C. 154(b) by 43 days.

This patent is subject to a terminal disclaimer.

(21) Appl. No.: 11/996,101

(22) PCT Filed: Jul. 13, 2006

(86) PCT No.: PCT/IB2006/003361
§ 371 (c)(1),
(2), (4) Date: Jan. 18, 2008

(87) PCT Pub. No.: WO2007/049151
PCT Pub. Date: May 3, 2007

(65) Prior Publication Data
US 2008/0212018 A1    Sep. 4, 2008

(30) Foreign Application Priority Data
Jul. 20, 2005 (FR) .................. 05 07722

(51) Int. Cl.
*G02C 7/02* (2006.01)
*G02C 7/04* (2006.01)
*G02C 7/00* (2006.01)
*A61F 2/14* (2006.01)

(52) U.S. Cl. ............... 351/177; 351/162; 351/160 R; 351/176; 351/163; 359/619; 359/642; 623/6.11

(58) Field of Classification Search ............. 351/159, 351/41, 163, 165–167; 359/618–622, 294–296, 359/290, 237; 264/1.7, 2.7; 349/13; 623/6.27–6.28, 623/6.22
See application file for complete search history.

(56) References Cited

U.S. PATENT DOCUMENTS
2,196,066 A    4/1940    Feinbloom
(Continued)

FOREIGN PATENT DOCUMENTS
AU    779628    2/2005
(Continued)

OTHER PUBLICATIONS

Lide, David R. CRC Handbook of Chemistry and Physics, 89th Edition (CRC Handbook of Chemistry & Physics). Null: CRC, 2008 pp. 10-12 through 10-13.*
(Continued)

*Primary Examiner* — Ricky Mack
*Assistant Examiner* — Zachary Wilkes
(74) *Attorney, Agent, or Firm* — Occhiuti Rohlicek & Tsao LLP

(57) ABSTRACT

A transparent optical component (10) comprises at least one transparent set of cells (15) juxtaposed parallel to one surface of the component, each cell being separated by absorbing walls (18) parallel to the component surface, and each cell being hermetically sealed and containing at least one substance with an optical property. The optical component may be cut out along a predefined contour and optionally drilled. The invention also relates to a method of producing such an optical component and its use for the production of an optical element. The optical element may especially be a spectacle lens.

34 Claims, 1 Drawing Sheet

U.S. PATENT DOCUMENTS

| | | |
|---|---|---|
| 2,511,329 A | 6/1950 | Craig |
| 3,532,038 A * | 10/1970 | Rottmann ..................... 359/619 |
| 3,628,854 A | 12/1971 | Jampolsky |
| 3,978,580 A | 9/1976 | Leupp et al. |
| 4,150,878 A * | 4/1979 | Barzilai et al. ................ 349/156 |
| 4,268,132 A | 5/1981 | Neefe |
| 4,601,545 A | 7/1986 | Kern |
| 4,621,912 A | 11/1986 | Meyer |
| 4,720,173 A | 1/1988 | Okada et al. |
| 4,791,417 A | 12/1988 | Bobak |
| 4,994,664 A | 2/1991 | Veldkamp |
| 5,044,742 A | 9/1991 | Cohen |
| 5,067,795 A * | 11/1991 | Senatore ......................... 349/14 |
| 5,139,707 A | 8/1992 | Guglielmetti et al. |
| 5,233,038 A | 8/1993 | Guglielmetti et al. |
| 5,359,444 A * | 10/1994 | Piosenka et al. .............. 351/169 |
| 5,529,725 A | 6/1996 | Guglielmetti et al. |
| 5,576,870 A | 11/1996 | Ohmae et al. |
| 5,604,280 A | 2/1997 | Pozzo et al. |
| 5,699,142 A | 12/1997 | Lee et al. |
| 5,733,077 A | 3/1998 | MacIntosh, Jr. |
| 5,763,054 A | 6/1998 | Samec et al. |
| 5,764,333 A | 6/1998 | Somsel |
| 5,774,273 A | 6/1998 | Bornhorst |
| 5,805,263 A * | 9/1998 | Reymondet et al. .......... 351/159 |
| 5,807,906 A | 9/1998 | Bonvallot et al. |
| 5,812,235 A | 9/1998 | Seidner et al. |
| 5,905,561 A | 5/1999 | Lee et al. |
| 5,914,802 A | 6/1999 | Stappaerts et al. |
| 6,019,914 A | 2/2000 | Lokshin et al. |
| 6,118,510 A | 9/2000 | Bradshaw et al. |
| 6,259,501 B1 | 7/2001 | Yaniv |
| 6,281,366 B1 | 8/2001 | Frigoli et al. |
| 6,301,051 B1 | 10/2001 | Sankur |
| 6,307,243 B1 | 10/2001 | Rhodes |
| 6,327,072 B1 | 12/2001 | Comiskey et al. |
| 6,485,599 B1 | 11/2002 | Glowina et al. |
| 6,577,434 B2 * | 6/2003 | Hamada ......................... 359/319 |
| 6,597,340 B1 | 7/2003 | Kawai |
| 6,707,516 B1 | 3/2004 | Johnson et al. |
| 6,712,466 B2 * | 3/2004 | Dreher ........................... 351/161 |
| 6,871,951 B2 | 3/2005 | Blum et al. |
| 6,963,435 B2 | 11/2005 | Mallya et al. |
| 6,987,605 B2 * | 1/2006 | Liang et al. ................... 359/296 |
| 7,036,929 B1 | 5/2006 | Harvey |
| 7,144,529 B1 | 12/2006 | Mercier |
| 7,227,692 B2 | 6/2007 | Li et al. |
| 7,289,260 B2 | 10/2007 | Kaufman et al. |
| 7,404,637 B2 | 7/2008 | Miller et al. |
| 7,533,453 B2 | 5/2009 | Yancy |
| 7,715,107 B2 | 5/2010 | Loopstra et al. |
| 7,808,707 B2 * | 10/2010 | Cano et al. .................... 359/619 |
| 2002/0008898 A1 | 1/2002 | Katase |
| 2002/0114054 A1 | 8/2002 | Rietjens |
| 2002/0140899 A1 | 10/2002 | Blum et al. |
| 2002/0145797 A1 | 10/2002 | Sales et al. |
| 2002/0167638 A1 | 11/2002 | Byun et al. |
| 2002/0176963 A1 | 11/2002 | Chen et al. |
| 2003/0021005 A1 | 1/2003 | Liang et al. |
| 2003/0035199 A1 | 2/2003 | Liang et al. |
| 2003/0085906 A1 | 5/2003 | Elliott et al. |
| 2003/0147046 A1 | 8/2003 | Shadduck |
| 2003/0152849 A1 | 8/2003 | Chan-Park et al. |
| 2003/0174385 A1 | 9/2003 | Liang et al. |
| 2003/0206260 A1 | 11/2003 | Kobayshi et al. |
| 2004/0008319 A1 | 1/2004 | Lai et al. |
| 2004/0027327 A1 | 2/2004 | LeCain et al. |
| 2004/0114111 A1 | 6/2004 | Watanabe |
| 2004/0120667 A1 | 6/2004 | Aylward et al. |
| 2004/0125247 A1 | 7/2004 | Seshan et al. |
| 2004/0125337 A1 | 7/2004 | Boulineau et al. |
| 2004/0165252 A1 | 8/2004 | Liang et al. |
| 2004/0169932 A1 | 9/2004 | Esch et al. |
| 2004/0190115 A1 | 9/2004 | Liang et al. |
| 2004/0233381 A1 * | 11/2004 | Kim et al. ..................... 351/110 |
| 2006/0006336 A1 | 1/2006 | Cano et al. |
| 2006/0087614 A1 | 4/2006 | Shadduck |
| 2006/0279848 A1 | 12/2006 | Kuiper et al. |
| 2007/0152560 A1 | 7/2007 | Naito et al. |
| 2008/0212018 A1 | 9/2008 | Ballet et al. |
| 2008/0314499 A1 | 12/2008 | Begon et al. |

FOREIGN PATENT DOCUMENTS

| | | |
|---|---|---|
| CA | 2340672 | 12/2000 |
| DE | 19714434 | 10/1998 |
| EP | 0728572 | 8/1996 |
| EP | 1308770 | 5/2003 |
| FR | 2561005 | 9/1985 |
| FR | 2718447 | 10/1995 |
| FR | 2872589 | 1/2006 |
| WO | 00/77570 | 12/2000 |
| WO | 02/01281 | 1/2002 |
| WO | 02/065215 | 8/2002 |
| WO | 03/012542 | 2/2003 |
| WO | 03/077012 | 9/2003 |
| WO | 03/102673 | 12/2003 |
| WO | 2004/051354 | 6/2004 |
| WO | 2005/033782 | 4/2005 |
| WO | 2006/013250 | 2/2006 |
| WO | 2006/050366 | 5/2006 |
| WO | 2006/067309 | 6/2006 |
| WO | 2007/010414 | 1/2007 |
| WO | 2007/023383 | 3/2007 |
| WO | 2007/144308 | 12/2007 |

OTHER PUBLICATIONS

Cognard, Philippe. "Colles et adhesifs pour emballages, Generalities," 18 pages (English Summary Provided), Nov. 10, 2001.

Fowles, Grant R. Introduction to Modern Optics. New York: Dover Publications, 1989. Print. pp. 138-139.

Hecht, Eugene, "Optics, $4^{th}$ Edition" 2002 Addison Wesley, p. 428 (XP002465206) (chapter 10 from $2^{nd}$ edition provided).

J-P. Perez, Optique: Fondements et Applications [Optics: Basics and Applications] $7^{th}$ edition, published by Dunod, Oct. 2004, p. 262.

Kaufman U.S. Appl. No. 60/507,940 Drawing Sheets 4, 5.

* cited by examiner

TRANSPARENT PIXELIZED OPTICAL COMPONENT WITH ABSORBING WALLS, ITS METHOD OF MANUFACTURE AND ITS USE IN THE MANUFACTURE OF A TRANSPARENT OPTICAL ELEMENT

CROSS-REFERENCE TO RELATED APPLICATIONS

This application is the National Stage of International Application No. PCT/IB2006/003361, filed on Jul. 13, 2006, which claims the priority of French Application No. 0507722, filed on Jul. 20, 2005. The contents of both applications are hereby incorporated by reference in their entirety.

The present invention relates to the production of transparent elements incorporating optical functions. It applies in particular to the production of ophthalmic lenses having miscellaneous optical properties.

Ametropia-correcting lenses are conventionally made by shaping a transparent material with a refractive index higher than air. The shape of the lenses is selected so that the refraction at the interfaces between the material and the air causes an appropriate focussing on the wearer's retina. The lens is generally cut out to be adapted to a frame, with an appropriate positioning with respect to the pupil of the corrected eye.

Among the various types of lenses, or others not necessarily limited to ophthalmic optics, it would be desirable to be able to propose a structure which serves to afford one or more optical functions in a flexible and modular manner, while preserving the possibility of cutting out the optical element obtained to incorporate it in a frame imposed or selected elsewhere, or in any other means for holding the said optical element.

It is the object of the present invention to answer this need. A further object is that the optical element should be industrially applicable under satisfactory conditions.

The invention thus proposes a method for the production of a transparent optical element, comprising the production of a transparent optical component having at least one set of cells juxtaposed parallel to one surface of the component, each cell being hermetically sealed and containing a substance with an optical property, said cells being separated by absorbing walls. Specifically, the walls are absorbing on sidewalls of these walls oriented substantially perpendicular to the surface of the component.

The invention also proposes a method for the production of a transparent optical element as defined above, additionally comprising a step of cutting out the optical component along a defined contour on the said surface, corresponding to a shape determined for the optical element.

The cells may be filled with various substances selected for their optical properties, for example associated with their refractive index, their light absorption or polarization capacity, their response to electrical or light stimuli, etc.

The structure thus lends itself to numerous applications, particularly those making use of advanced optical functions. It implies a discretization by pixels of the surface area of the optical element, offering great flexibility in the design and also the application of the element. The structure thus comprises a cell network bounded by walls, said walls being absorbing in the visible spectrum. The walls thus do not permit the propagation of light, over all or part of the visible spectrum, when the propagation direction has a component parallel to the surface of the optical component.

It is possible to produce structures pixelized by discretization which consist of a succession of adjacent cells in the plane. These cells are separated by walls. These walls cause a transparency defect of the optical component and they may accordingly give rise to a transparency defect of the optical element comprising such a component. In the context of the invention, an optical component is said to be transparent when the observation of an image through said optical component is perceived without a significant loss of contrast, that is, when the formation of an image through said optical component is obtained without harming the quality of the image. In the context of the invention, this definition of the term transparent is applicable to all objects qualified as such in the description.

The walls separating the cells of the optical component interact with the light by diffracting it. Diffraction is defined as the scattering of light that is observed when a light wave is materially limited (J-P. Perez—Optique, Fondements et applications $7^{th}$ edition—Dunod—October 2004, p. 262). Thus an optical component comprising such walls transmits a degraded image because of this scattering of the light caused by said walls. Microscopic diffraction is macroscopically manifested by scattering. This macroscopic scattering or incoherent scattering is manifested by a diffuse halo of the pixelized structure of the optical component and hence by a loss of contrast of the image observed through said structure. This loss of contrast can be regarded as a loss of transparency, as defined above. This macroscopic scattering effect is unacceptable for making an optical element comprising a pixelized optical component as understood in the context of the invention. This is especially true when the optical element is an ophthalmic lens, which must on the one hand be transparent, in the sense defined above, and on the other, comprise no cosmetic defect liable to disturb the view of the wearer of such an optical element.

A means for diminishing this macroscopic scattering consists in reducing the diffraction at the walls by preventing the light from propagating into the walls separating the cells. This is because some of the light that is absorbed or reflected is not diffracted. Thus, a wall for which the interaction with the light is limited will diffract less than a wall that lets the light propagate. If a set of walls is now considered, the reduction in diffraction by each of the walls causes at the macroscopic level the reduction of the diffusing aspect of the whole assembly.

One aspect of the present invention is hence to produce a transparent optical component, comprising a set of cells juxtaposed parallel to the surface of a substrate in which the cells are separated from one another by absorbing walls. Specifically, the walls are absorbing on sidewalls of these walls that are substantially perpendicular to the surface of the component. In such an optical component, the walls absorb all or some of the light reaching them, thus reducing the macroscopic scattering of the object, thereby making it possible to produce a transparent optical element comprising an optical component as described.

The invention therefore relates to a method for obtaining a transparent optical element comprising a set of juxtaposed cells parallel to the surface of the said component, each cell being separated from one another by walls that are absorbing over all or part of the visible spectrum, said walls comprising one or more materials chosen from absorbing crosslinkable materials and absorbing polymerizable materials. Other materials may be used to produce the absorbing walls. For example, mention may be made of hybrid materials, such as sol-gel resins, or composites, such as ceramic/metal or silica/metal mixtures. The walls may also be absorbing if they consist of or are coated with a metal chosen especially from silver, chromium, titanium, platinum, nickel, copper, iron, zinc, tin, palladium and gold. In this case, the walls are both absorbing and reflecting. In the context of the invention, absorbing material means a material which absorbs at least part of the visible spectrum, that is, having at least one wavelength absorption band between 400 nm and 700 nm. Advantageously according to the invention, materials having an absorption band over the entire visible spectrum are preferred. The materials used for making the walls may optionally comprise a spectral absorption band in the near infrared, i.e above 700 nm, and/or in the near ultraviolet, i.e. below 400 nm.

In this embodiment of the invention, the constituent material of the walls may be intrinsically absorbing or made absorbing by doping, by diffusion or by absorption of absorbing particles. Among absorbing particles that can supply a crosslinkable or polymerizable material with a visible light absorption property, mention may in particular be made of dyes, inks, pigments, colloids, carbon nanotubes, carbon black and metal or metal alloy particles. These particles may easily be incorporated into polymers of the sol-gel, polyurethane, acrylate or epoxy type using methods well known to those skilled in the art. Polymers thus obtained have at least one absorption band between 400 nm and 700 nm, and preferably absorb over the entire visible spectrum between 400 nm and 700 nm. Among metal particles, mention may in particular be made of metals such as silver, chromium, titanium, platinum, nickel, copper, iron, zinc, tin, palladium and gold. Preferably, the absorbing material is chosen from silver, aluminium, titanium, chromium and gold.

The cell network, and hence the construction of the network walls, can be achieved by using manufacturing methods, derived from microelectronics, well known to a person skilled in the art. As a non-limiting illustration, mention can be made of methods such as hot printing, hot embossing, micromoulding, photolithography (hard, soft, positive, negative), microdeposition such as micro-contact printing, screen printing, or ink jet printing.

All the absorbing walls (and consequently the set of cells of the optical component) can be formed directly on a rigid transparent support, or within a flexible transparent film then transferred on to a rigid transparent support. Said rigid transparent support may be convex, concave, or plane on the side receiving the cells.

The geometry of the cell network is characterized by dimensional parameters which can generally be reduced to the dimensions (D) of the cells parallel to the surface of the optical component, to their height corresponding to the height (h) of the absorbing walls separating them, and to the thickness (e) of these walls (measured parallel to the component surface). Parallel to the component surface, the cells are preferably separated by walls of thickness (e) between 0.10 µm and 5 µm and of height (h) less than 100 µm, and preferably between 1 µm and 50 µm inclusive.

With a dimensioning of the walls as defined above, it is possible to make a set of cells juxtaposed at the surface of the optical component having a fill factor τ of higher than 90%. In the context of the invention, the fill factor is defined as the area occupied by the cells filled by the substance, per unit area of the optical component. In other words, all together the cells occupy at least 90% of the area of the component, at least in a region of the optical component provided with the set of cells. Advantageously, the fill factor is between 90% and 99.5% inclusive.

In one embodiment of the method, the substance with an optical property contained in at least some of the cells is in liquid or gel form. Said substance may particularly have at least one of the optical properties selected from tinting, photochromism, polarization and refractive index.

One aspect of the present invention is a method of producing a transparent optical component as defined above, which comprises the formation, on a substrate, of a network of absorbing walls in order to delimit the cells parallel to said surface of the component, the collected or individual filling of the cells with the substance exhibiting an optical property, in liquid or gel form, and the closure of the cells on their opposite side from the substrate.

The set of cells of the optical component may include several groups of cells containing different substances. Similarly, each cell may be filled with a substance having one or more optical properties described above. It is also possible to stack several sets of cells over the thickness of the component. In this embodiment, the sets of cells may have identical or different properties within each layer, or the cells within each set of cells may also have different optical properties. Thus, it is possible to envisage having one layer in which the set of cells contains a substance for obtaining a variation in the refractive index and another layer in which the set of cells contains a substance having a photochromic property.

Another aspect of the invention relates to a transparent optical component used in the above method. This optical component comprises at least one transparent set of juxtaposed cells parallel to one surface of the component, each cell being separated by absorbing walls. Each cell is hermetically sealed and contains at least one substance exhibiting an optical property.

A further aspect of the invention relates to a transparent optical element, particularly a spectacle lens, made by cutting out such an optical component. A spectacle lens comprises an ophthalmic lens. Ophthalmic lens means lenses adapting to a spectacle frame to protect the eye and/or correct the vision, these lenses being selected from afocal, unifocal, bifocal, trifocal and progressive lenses. While ophthalmic optics is a preferred field of application of the invention, it should be understood that this invention is applicable to transparent optical elements of other types, such as, for example, lenses for optical instruments, filters particularly for photography or astronomy, optical sighting lenses, ocular visors, optics of lighting devices, etc. In the invention, ophthalmic optics includes ophthalmic lenses, as well as contact lenses and ocular implants.

Other features and advantages of the present invention will appear in the description below of non-limiting exemplary embodiments, with reference to the drawings appended hereto, in which.

Figure 1:
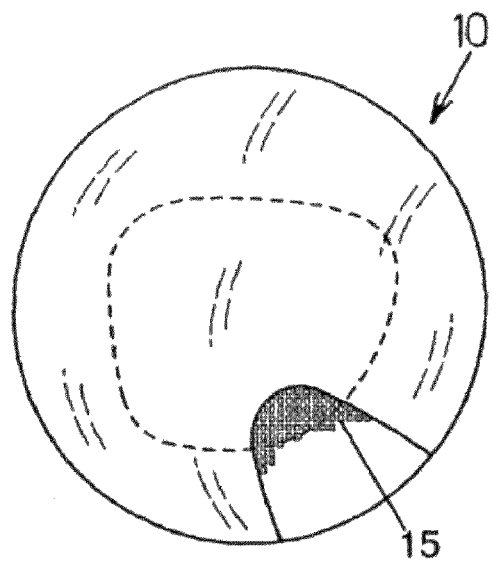
FIG. 1 is a front view of an optical component of the invention.

The optical component 10 shown in FIG. 1 is a blank for a spectacle lens. A spectacle lens comprises an ophthalmic lens, as defined above. Naturally, while ophthalmic optics is a preferred field of application of the invention, it should be understood that this invention is applicable to transparent optical elements of other types.

Figure 2:
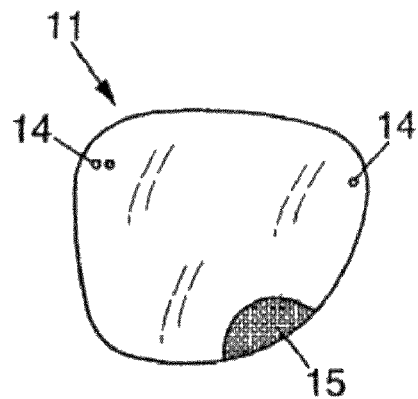
FIG. 2 is a front view of an optical element obtained from this optical component.

FIG. 2 shows a spectacle lens 11 obtained by cutting out the blank 10 along a predefined contour, shown by a broken line in FIG. 1. This contour is basically arbitrary, provided it fits into the area of the blank. Quantity produced blanks can thus be used to obtain lenses adaptable to a wide variety of spectacle frames. The edge of the lens cut out can be trimmed without any problem, conventionally, to give it a shape adapted to the frame and to the method for fixing the lens to this frame and/or for aesthetic reasons. It is possible to drill holes 14 therein, for example to receive screws used to fasten it to the frame.

Figure 3:
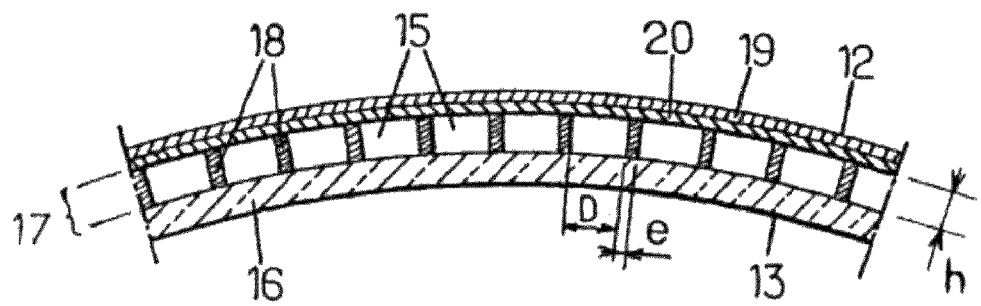
FIG. 3 is a schematic cross section of an optical component according to a first embodiment of the invention.

The general shape of the blank 10 may conform to industry standards, with, for example, a circular contour with a diameter of 70 mm (millimeters), a front convex face 12, and a back concave face 13 (FIG. 3). Conventional cutting, trimming and drilling tools can thus be used to obtain the lens 11 from the blank 10.

In FIGS. 1 and 2, a partial removal of the surface layers reveals the pixelized structure of the blank 10 and the lens 11. This structure consists of a network of cells or microtanks 15 formed in a layer 17 of the component, each cell being separated by walls 18 comprising an absorbing material (FIG. 3). In these figures, the dimensions of the layer 17, the walls 18, and the cells 15 have been exaggerated compared to those of the blank 10 and of its substrate 16 in order to make it easier to examine the drawing.

The lateral dimensions (D) of the cells 15 (parallel to the surface of the blank 10) are greater than 1 micron and may range up to a few millimeters. This network of cells can thus be produced using technologies that are well established in the field of microelectronics or of micromechanical devices. The height (h) of the constituent layer 17 of the absorbing walls 18 is preferably between 1 μm and 50 μm. The absorbing walls 18 have a thickness (e) of between 0.1 μm and 5.0 μm, making it possible in particular to obtain a high fill factor.

The layer 17 incorporating the cell network 15 may be covered by a number of additional layers 19, 20 (FIG. 1), according to standard practice in ophthalmic optics. These layers have functions, for example, of impact strength, scratch resistance, tinting, anti-reflective, anti-soiling, etc. In the example shown, the layer 17 incorporating the cell network is placed immediately above the transparent substrate 16, but it should be understood that one or more intermediate layers may be located between them, such as layers having functions of impact strength, scratch resistance, and tinting.

Moreover, it is possible for several networks of cells to be present in the stack of layers formed on the substrate. It is thus possible, for example, for the stack of layers to include, in particular one cell network layer in which the cells contain a substance for giving the element photochromic functions, and another layer for giving the element refractive index variation functions. These cell network layers may also alternate with additional layers, as described above.

The various combinations are possible thanks in particular to the great flexibility of the method of producing the transparent optical element. Thus, within the context of the invention, the optical component may comprise a cell network in which each cell is filled with a substance having one or more optical properties, or else in which the set of cells 15 includes several groups of cells containing different substances. The optical component may also consist of a stack that includes at least two layers of a set of cells, each set of cells having identical optical properties, or each set of cells having different optical properties, or the cells within each set of cells having different optical properties.

The transparent substrate 16 may be made from glass or various plastics commonly used in ophthalmic optics. Among the plastics that may be used, mention can be made, in an indicative and non-limiting manner, of polycarbonates; nylon, polyimides, polysulphones; polyethylene terephthalate/polycarbonate copolymers, polyolefins, particularly polynorbornenes; polymers and copolymers of diethylene glycol, bis(allylcarbonate); (meth)acrylic polymers and copolymers particularly (meth)acrylic polymers and copolymers derived from bisphenol A; thio(meth)acrylic polymers and copolymers; urethane and thiourethane polymers and copolymers; epoxy polymers and copolymers; and episulphide polymers and copolymers.

The layer 17 incorporating the cell network is preferably located on its front convex face 12, the back concave face 13 remaining free to be optionally reshaped by machining and polishing if necessary. The optical component may also be located on the concave face of a lens. Obviously, the optical component may also be integrated on a plane optical element.

The microtanks 15 are filled with the substance with an optical property, in the liquid or gel state. A prior treatment of the front face of the component may optionally be applied to facilitate surface-wetting of the material of the walls and of the bottom of the microtanks. The solution or suspension forming the substance with an optical property may be the same for all the microtanks of the network, in which case it can be introduced simply by immersing the component in an appropriate bath, by a method such as silk screen printing, by a spin-on process, by a method of spreading the substance by means of a roller or a doctor blade, or by a spray process. It is also possible to inject it locally into the individual microtanks using a ink jet system.

To hermetically seal a set of filled microtanks, a bonded plastic film, for example, can be applied, heat sealed or hot laminated to the top of the walls 18. It is also possible to deposit, on the zone to be closed, a solution polymerizable material, immiscible with the substance with an optical property contained in the microtanks, and then to polymerize this material, for example by heat or irradiation.

Once the network of microtanks 15 has been completed, the component can receive the additional layers or coatings 19, 20 to terminate its fabrication. Components of this type are fabricated in series and stored to be subsequently retrieved and cut out individually according to the needs of a client.

If the substance with an optical property is not intended to remain in the liquid or gel state, a solidification treatment may be applied to it, for example a heating and/or irradiation sequence, at an appropriate stage starting from the time the substance has been deposited.

In one variant, the optical component, consisting of a network of microtanks, is constructed in the form of a flexible transparent film. Such a film can be made by techniques similar to those described above. In this case, the film can be made on a plane and non-convex or concave support.

The film is, for example, manufactured industrially on a relatively large scale, and then cut out to the appropriate dimensions to be transferred to the substrate 16 of a blank. This transfer can be achieved by bonding the flexible film, by thermoforming the film, or by physical adhesion under vacuum. The film can then receive various coatings, as in the previous case, or be transferred to the substrate 16 itself coated with one or more additional layers as described above.

In one field of application of the invention, the optical property of the substance introduced into the microtanks 15 is related to its refractive index. The refractive index of the substance is modulated along the surface of the component to obtain a correction lens. In a first variant of the invention, the modulation, can be achieved by introducing substances with different indices during the fabrication of the network of microtanks 15.

In another variant of the invention, the modulation can be achieved by introducing into the microtanks 15 a substance whose refractive index can be subsequently adjusted by irradiation. The writing of the correcting optical function is then carried out by exposing the blank 10 or the lens 11 to light whose energy varies along the surface in order to obtain the desired index profile so as to correct a patient's vision. This light is typically that produced by a laser, the writing equipment being similar to that used for writing CD-ROMs or other optical memory media. The exposure of the photosensitive substance to a greater or lesser extent may result from a modulation in the power of the laser and/or the choice of exposure time.

Among the substances usable in this application, mention can be made, for example, of mesoporous materials or liquid crystals. These liquid crystals can be fixed by a polymerization reaction, for example caused by irradiation. They can thus be fixed in a state selected to introduce a predefined optical delay in the light waves passing through them. In the case of a mesoporous material, the refractive index of the material can be controlled by varying its porosity. Another possibility is to use photopolymers, of which one well known property is to change the refractive index during the polymerization reaction caused by irradiation. These changes in index are due to a modification of the density of the material and to a change in chemical structure. It is preferable to use photopolymers, which only undergo a very slight variation in volume during the polymerization reaction.

The selective polymerization of the solution or suspension is carried out in the presence of radiation that is spatially differentiated from the component surface, in order to obtain the desired index modulation. This modulation is previously determined according to the estimated ametropia of the eye of a patient to be corrected.

In another application of the invention, the substance introduced in gel or liquid form into the microtanks has a polarization property. Among the substances used in this application, mention can be made of liquid crystals.

In another application of the invention, the substance introduced in liquid or gel form into the microtanks has a photochromic property. Among the substances used in this application, mention can be made for example of photochromic compounds containing a central motif such as a spirooxazine, spiro(indoline-[2,3']-benzoxazine), chromene, homoazaadamantane spiroxazine, spirofluorene-(2H)-benzopyrane, naphtho [2,1-b]pyrane nucleus.

In the context of the invention, the substance with an optical property may be a dye, or a pigment suitable for modifying the transmission rate.

The invention claimed is:

1. Method for the production of a transparent optical element, the transparent optical element selected from ophthalmic lenses, contact lenses and ocular implants, the method comprising the production of a transparent optical component having at least one set of cells juxtaposed parallel to one surface of the component, each cell being hermetically sealed and containing a substance with an optical property, the cells being separated by absorbing walls, said walls being absorbing on sidewalls oriented substantially perpendicular to the component surface, the transparent optical component configured so that a single image of an object is obtained when the object is viewed through the whole set of cells, the set of cells having a fill factor of between 90% and 99.5% inclusive parallel to said component surface.

2. Method for the production of a transparent optical element according to claim 1, additionally comprising a step of cutting out the optical component along a defined contour on said surface, corresponding to a shape determined for the optical element.

3. Method according to claim 1, in which the absorbing walls have at least one absorption band at a wavelength between 400 nm and 700 nm.

4. Method according to claim 3, in which the absorbing walls also have a spectral absorption band in at least one of the near infrared, including wavelengths above 700 nm, and in the near ultraviolet, including wavelengths below 400 nm.

5. Method according to claim 1, in which the absorbing walls have an absorption band over the entire visible spectrum.

6. Method according to claim 1, in which the walls comprise one or more materials chosen from absorbing crosslinkable materials, absorbing polymerizable materials, hybrid materials, composites and metals.

7. Method according to claim 6, in which the constituent absorbing material or materials of the walls are chosen from intrinsically absorbing materials or materials rendered absorbing by doping, by diffusion or by absorption of absorbing particles.

8. Method according to claim 6, in which the absorbing crosslinkable and polymerizable materials include particles chosen from dyes, inks, pigments, colloids, carbon nanotubes, carbon black, metal particles and metal alloy particles.

9. Method according to claim 8, in which the metal particles are chosen from silver, chromium, titanium, platinum, nickel, copper, iron, zinc, tin, palladium and gold.

10. Method according to claim 1, which further includes a step of drilling through the transparent optical component, in order to fix the optical element to a maintaining support.

11. Method according to claim 1, in which the set of cells of the optical component is formed directly on a rigid transparent support, or within a flexible transparent film subsequently bonded to a rigid transparent support.

12. Method according to claim 11, in which the production of the transparent optical component comprises the formation of the set of cells and of the absorbing walls within a flexible transparent film followed by the bonding of said film to a rigid transparent support.

13. Method according to claim 11, in which the rigid transparent support is selected from convex, concave and plane, on the side receiving the cell network.

14. Method according to claim 1, in which the substance with an optical property contained in the set of cells is in liquid or gel form.

15. Method according to claim 1, in which the production of the transparent optical component comprises the formation, on a substrate, of a network of absorbing walls in order to delimit the cells parallel to said surface of the component, the collective or individual filling of the cells with the substance exhibiting an optical property, in liquid or gel form, and the closure of the cells on their opposite side from the substrate.

16. Method according to claim 1, in which the optical property is selected from a property of tinting, photochromism, polarization and refractive index.

17. Method according to claim 1, in which the cells are separated by absorbing walls of thickness in a direction parallel to the component surface between 0.10 µm and 5 µm.

18. Method according to claim 1, in which the set of cells constitutes a layer of thickness between 1 µm and 50 µm inclusive.

19. Transparent optical component comprising at least one transparent set of cells juxtaposed parallel to one surface of the component, each cell being separated by absorbing walls parallel to the component surface, each cell being hermetically sealed and containing at least one substance with an optical property, said walls being absorbing on sidewalls oriented substantially perpendicular to the component surface, the transparent optical component configured as a transparent optical element selected from ophthalmic lenses, contact lenses and ocular implants, the transparent optical component further configured so that a single image of an object is obtained when the object is viewed through the whole set of cells, the set of cells having a fill factor of between 90% and 99.5% inclusive parallel to said component surface.

20. Optical component according to claim 19, comprising a rigid transparent support on which the set of cells and the set of absorbing walls are formed.

21. Optical component according to claim 20, which comprises a rigid transparent support to which a transparent film incorporating the set of cells and the set of absorbing walls is bonded.

22. Optical component according to claim 19, in which the absorbing walls have at least one absorption band at a wavelength between 400 nm and 700 nm.

23. Optical component according to claim 22, in which the absorbing walls have an absorption band over the entire visible spectrum.

24. Optical component according to claim 22, in which the absorbing walls also have a spectral absorption band in at least one of the near infrared, including wavelengths above 700 nm, and in the near ultraviolet, including wavelengths below 400 nm.

25. Optical component according to claim 19, in which the walls comprise one or more materials chosen from absorbing crosslinkable materials, absorbing polymerizable materials, hybrid materials, composites and metals.

26. Optical component according to claim 19, in which the constituent absorbing material or materials of the walls are chosen from intrinsically absorbing materials or materials rendered absorbing by doping, by diffusion or by absorption of absorbing particles.

27. Optical component according to claim 26, in which the absorbing particles are chosen from dyes, inks, pigments, colloids, carbon nanotubes, carbon black, metal particles and metal alloy particles.

28. Optical component according to claim 27, in which the metal particles are chosen from silver, chromium, titanium, platinum, nickel, copper, iron, zinc, tin, palladium and gold.

29. Optical component according to claim 19, in which the substance with an optical property contained in at least some of the cells is in liquid or gel form.

30. Optical component according to claim 19, in which the optical property is selected from a property of tinting, photochromism, polarization, refractive index.

31. Optical component according to claim 19, in which the cells are separated by absorbing walls of thickness in a direction parallel to the component surface between 0.10 µm and 5 µm.

32. Optical component according to claim 19, in which the set of cells constitutes a layer of thickness between 1 µm and 50 µm inclusive.

33. Spectacle lens, made by cutting out an optical component according to claim 19.

34. Spectacle lens according to claim 33, in which at least one hole is drilled through the component to fasten the lens to a frame.

* * * * *